July 17, 1928.                    1,677,512
R. C. BENNER
SEPARATOR
Filed March 30, 1923

Electrolyte permeable material

Plastic bonded Separator containing permeable pore-obstructing material

Inventor:
Raymond C. Benner,
By Byrne Townsend & Brickenstein
Attorneys.

Patented July 17, 1928.

1,677,512

UNITED STATES PATENT OFFICE.

RAYMOND C. BENNER, OF BAYSIDE, NEW YORK, ASSIGNOR, BY MESNE ASSIGNMENTS, TO PREST-O-LITE STORAGE BATTERY CORPORATION, A CORPORATION OF INDIANA.

SEPARATOR.

Application filed March 30, 1923. Serial No. 628,843.

This invention relates to improvements in electrode separators, and comprises the combination of a permeable gel, or the like, with porous sheets of plastic or plastic-bonded material.

For most purposes it is desirable that the separators of a battery should add as little as possible to the internal resistance. As the porosity of the separator is increased, the electrolytic action is less impeded and the resistance is correspondingly decreased. But it is obvious that any large degree of porosity will defeat a primary purpose of the separator, the prevention of short circuits between plates of opposite polarity. According to the present invention, the perforations or pores of plastic or plastic-bonded separators are obstructed by a material readily permeable by electrolyte. When so treated, separators of relatively high porosity may be used without encountering difficulty due to formation of conductive bridges of solid materials between adjacent plates. The resistance of the treated separators in the battery assembly is low. In my application Serial No. 557,906, filed May 2, 1922, of which the present is a continuation-in-part, certain constructions analogous to those herein are described and claimed.

The present invention also comprises an improved method of making plastic-bonded fiber separators, adapted to be treated as described, or for other purposes.

The invention will be described in connection with the accompanying drawing, in which Fig. 1 is a front elevation of a separator formed from plastic material and having a permeable obstructing material in its perforations;

Figure 1:
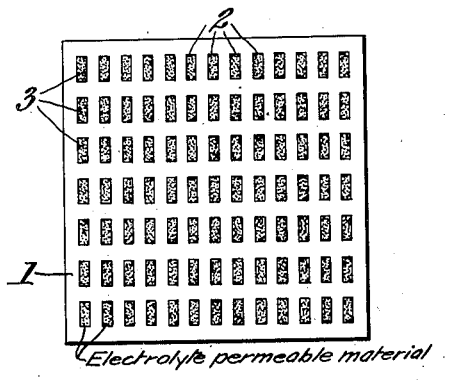

Referring to the drawings, numeral 1 denotes a perforated separator formed from any suitable material, for example hard rubber. The perforations 2 may be of a size somewhat larger than is customary in separators of this type. Obstructing the perforations is a permeable material 3. This is preferably formed by immersing the separator in a sirupy solution of a soluble silicate, which upon immersion in sulfuric acid electrolyte reacts to form gelatinous silicic acid. The precipitate is sufficiently strong and coherent to form a permanent obstruction in the openings, but is readily permeable by electrolyte. The pore-obstructing material need not consist solely of a gel. Mixtures of soluble silicate and fibrous material are satisfactory, and various other equivalents may be used to attain the result herein described. When silicate-fiber mixtures are used, it is practical to obtain satisfactory permeable obstructions in openings of very considerable size.

Figure 3:
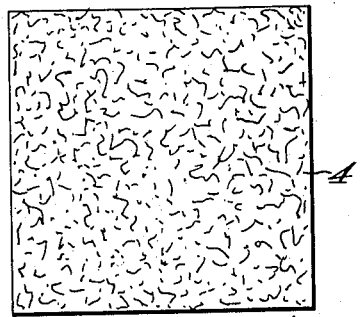
Fig. 3 is a front elevation of an impregnated plastic-bonded fiber separator.
Figure 2:
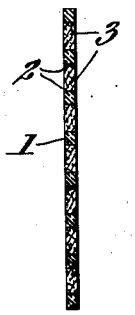
Fig. 2 is a vertical transverse section through the separator of Fig. 1.
Figure 4:
Fig. 4 is a vertical transverse section on an enlarged scale through a portion of the separator of Fig. 3.

In Fig. 3 a silicated plastic-bonded fiber separator 4 is illustrated. I have devised an improved method of making plastic-bonded separators, for use with or without impregnation with silica gel, or the like. The method comprises the following steps: Short fibers, preferably acid-resistant fibers such as those obtained by the sulfite pulp process or similar processes, are mixed with a binder, which may advantageously be rubber dissolved in a suitable solvent. The rubber and solvent mixture should be in a uniform pasty condition. Any desired additions may be made at this point, for example a filler such as lampblack.

The fiber, additions, and rubber solution, are thoroughly worked together, preferably in a steam heated mixer. Sulfur and a vulcanizing accelerator are added to the mixture, after it has cooled. The composition is then fed between rolls which simultaneously receive a supply of long, acid-resistant fibers such as animal hair, hemp, jute, mineral wool, or the like. The rolls incorporate the long fibers with a minimum of breakage in the plastic-bonded mass.

The greater portion of the rubber solvent should be evaporated during the rolling operation to prevent the formation of a "skin" on the surface of the finished product. When the solvent is allowed to evaporate after the working of the material is finished, it brings with it to the surface relatively large amounts of the solute, which solidifies in a substantially impervious layer. This is prevented by preliminary removal of the solvent, as described, and the material retains sufficient plasticity to be shaped into the desired form. The rolls may be heated to aid in expelling the solvent. Upon removal from the mixing rolls the sheets are reduced in thickness, if necessary, and are then vulcanized.

The proportions of fibrous materials and rubber may be widely varied. An essential feature is the use of short fibers with fibers of relatively great length. The former are preferably sulfite pulp fibers, or other cellulosic fibers prepared by processes which free them from components which might be harmful in the battery, and the latter may be any acid-resistant long-fibered material not giving rise to objectionable effects.

When plastic-bonded separators of the type described are to be impregnated with a permeable gelatinous material, it is desirable to make them up with a relatively large amount of soluble fiber and to remove the greater portion of this fiber by suitable treatment before or after impregnating. Or insoluble fibers alone may be associated with a relatively small quantity of binder, so that a highly porous sheet is formed. Volatile or soluble salts or other compounds may be added to insure the desired porosity. When treated with a soluble silicate or equivalent material and a precipitant for the gel-forming body, the pores of the separator are obstructed so as to prevent passage of active material without considerably increasing the resistance to electrolytic action. The stiffness and strength of the separator are also materially increased by the impregnation. A further important advantage of the silica gel is the protection of fibers, which may not be fully embedded in the plastic, from oxidation by contact with the positive electrode.

The use of pore-obstructing means enables me to make advantageous use of inexpensive coarse or bulky substances as the base of the separator. Satisfactory separators may be made for example from wood screenings, sulfite screenings, or similar materials containing small chips or slivers of wood. When bonded with a plastic these materials give porous sheets well adapted for separating use after impregnation with silicic acid or the like.

I am aware that it has heretofore been proposed to impregnate wood with silica gel to prevent the destructive action of acid and oxidation. The present invention is distinguished from this prior procedure by use of silica gel or equivalent material in combination with very porous acid-resistant separators requiring no such protection. As a result of this combination, low resistance material having high separating efficiency is obtained.

The advantages obtained are not necessarily dependent upon the specific process described, and various changes may be made within the scope of the invention as defined in the appended claims.

I claim:

1. A separator comprising a fibrous material bonded with an acid-resistant plastic and having pores obstructed with a material capable of yielding a gelatinous, acid-proof decomposition residue permeable by electrolyte.

2. A separator comprising a mixture of soluble and insoluble fibers bonded with an acid-resistant plastic, and having pores obstructed with a material capable of yielding a gelatinous, acid-proof decomposition residue permeable by electrolyte.

3. A separator comprising short fibers in admixture with fibers of much greater length, the whole being bonded with an acid-resistant plastic and having pores obstructed with a material capable of yielding a gelatinous, acid-proof decomposition residue permeable by electrolyte.

4. A separator comprising a body of rubber having openings obstructed with a material capable of yielding a gelatinous, acid-proof decomposition residue permeable by electrolyte.

In testimony whereof, I affix my signature.

RAYMOND C. BENNER.